United States Patent Office 2,832,609
Patented Apr. 29, 1958

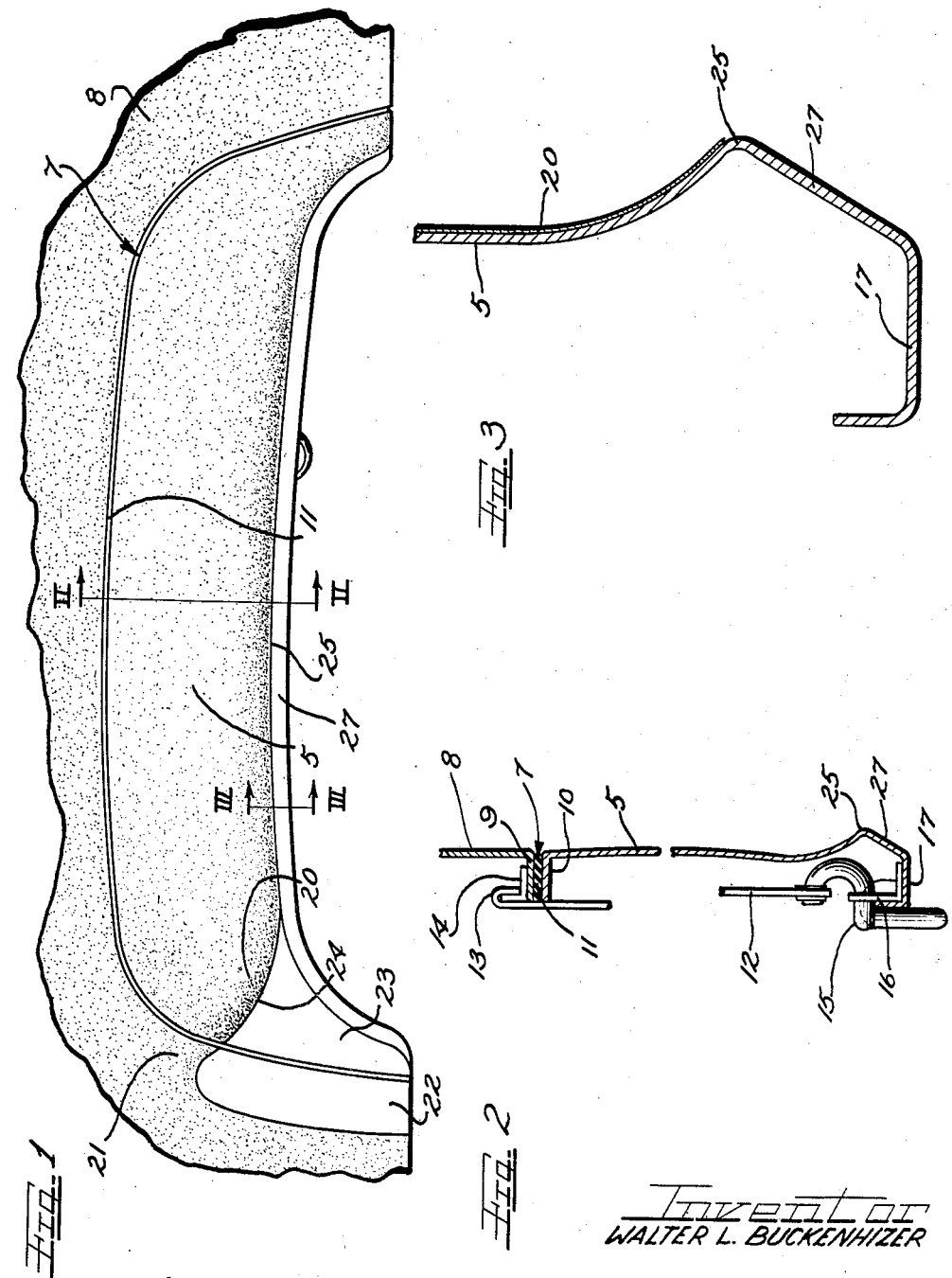

2,832,609

FENDER AND FENDER SHIELD ASSEMBLY

Walter L. Buckenhizer, East Detroit, Mich., assignor to Houdaille Industries, Inc., a corporation of Michigan Application August 18, 1955, Serial No. 529,250

3 Claims. (Cl. 280—153)

The present invention relates to improvements in fender and fender shield assemblies and more particularly concerns a novel construction and relationship in a vehicle fender shield or skirt and in association with a fender with which it may be assembled.

In the vehicle industry, and particularly in the automobile branch thereof, various means have been utilized to improve the appearance of vehicle fenders and to afford protection at various points thereon. The usual vehicle fender is provided with an opening affording access to the vehicle wheel and permitting ready removal or replacement of the wheel in an axial direction. Since this opening inherently presents an unattractive outward appearance, and enables splashing of road dirt or fluids onto the fender, detachable fender shields or skirts have been employed to cover the opening protectively and ornamentally.

As the term "fender shield" shall hereinafter be employed, it refers to any of the general type of members described which is adapted to be secured to a fender or other portion of a vehicle body for the purpose of covering the opening in the fender or vehicle body provided for access to or removal of a vehicle wheel. Furthermore, as the term "fender" shall hereinafter be employed, it refers to any form of wheel fender in its broad sense, whether such fender be separated from the vehicle body, partly separated from the vehicle body, or actually an integral part of the vehicle body, and whether or not it projects outwardly from the principal body portion of the vehicle.

An important object of the present invention is to provide a novel fender and fender shield assembly having an improved cooperative relationship of the fender shield with ornamental or protective structure on the fender.

Another object of the invention is to provide an improved fender shield having a novel construction whereby although the fender shield is provided with a rib-like or "blister" structure along the lower margin thereof, stones or grit thrown up by the tires of the vehicle will not damage the finish of the blister to any perceptible extent and the blister protects the remainder of the fender shield against damage to the finish thereof, and this is accomplished without adding any protective assembly or additional part to the fender shield.

A further object of the invention is to provide an improved, economical and readily adaptable fender shield construction.

Other objects, features and advantages of the present invention will be readily apparent from the following detailed description of a preferred embodiment thereof taken in conjunction with the accompanying drawing, in which:

Figure 1 is a fragmentary side elevational view of a vehicle fender and fender shield assembly;

Figure 2 is an enlarged fragmental vertical sectional detail view taken substantially on the line II—II of Fig. 1; and Figure 3 is a substantially enlarged fragmentary vertical sectional detail view taken substantially on the line III—III of Fig. 1.

In Figures 1 and 2 is shown more or less schematically a fender and fender shield assembly wherein a fender shield 5 is constructed and arranged to be mounted in protective and ornamental relation within a wheel access opening 7 of a vehicle fender 8. The wheel access opening 7 is of generally elongated form in horizontal direction and may be fairly shallow or of rather small dimension vertically and with the upper and end margins of the fender about the access opening defined by an inwardly directed angular reinforcing and finishing flange 9.

At its upper and end margins, the fender shield 5 is of a shape complementary to the shape of the wheel access opening and is adapted to fit fairly closely within the bounds of the wheel access opening as defined by the fender flange 9. For this purpose the fender shield 5 comprises a metallic panel which has at the upper and end margins thereof an inturned flange 10 which is complementary to the flange 9 of the fender and carries a sealing gasket 11 which is preferably of an elastomeric material and is compressed between the fender and fender shield flanges in the assembly to provide a seal against dirt working outwardly through the joint between the fender and fender shield in service.

For supporting the fender shield 5 within the wheel access opening 7 any suitable attaching means may be provided, preferably of a nature to permit ready removal of the fender shield as desired. To this end, suitable attachment structure may be provided at the opposite ends of the fender shield, and such structures are well known in the art. Centrally the fender shield may be provided with a latching mechanism including a bar 12 having at the upper end thereof a hook 13 adapted to engage with a bracket 14 mounted on the fender flange 9. The latching bar 12 is adapted to be manipulated for movement generally vertically through the medium of a latch member 14 that is pivotally mounted upon a bracket 15 carried by an inturned lower marginal flange 17 of the fender shield panel.

It is customary to finish the outside surface of the fender shield panel to match the finish of the vehicle and more particularly of the fender. For this purpose, the outer side of the fender shield panel 5 is provided with a suitable coat or coats of paint or enamel 20 (Fig. 3) that matches or conforms to the finish on the fender 8. In Fig. 1 the matching finish 20 on the outer surface of the fender shield panel is shown stippled in on the drawing while the finish on the fender is also shown stippled in and identified at 21.

According to conventional practice the fender shield 5 would be covered all over its surface with the finish 20 since the material from which the fender shield panel would conventionally be constructed would probably be cold rolled steel.

However, the fender 8 may be provided with an ornamental or protective member 22 such as a gravel guard mounted immediately adjacent one end of the wheel access opening 7 on the fender and generally at the front end portion of the fender. Such a gravel guard member may be made from stainless steel and with the surface thereof polished to a high luster and possibly even chrome plated to improve the lustrous finish. To match the ornamental and protective member 22 a conventional fender shield would be equipped with a trim applied thereto as a separate piece over the outer finish on the fender shield.

According to the present invention, however, the fender shield panel 5 is made from a material that will inherently take a natural polished finish similarly to the ornamental stone guard 22. Thus, the fender shield panel 5 may be made from stainless steel of appropriate grade to take a polish finish that will substantially match the finish on the member 22. In Fig. 1 this relationship is shown wherein the area identified at 23 adjacent to the ornament or stone guard 22 is in a polished natural finish condition while therebeyond, as shown by a separation line 24 on Fig. 1, the fender shield may be enameled or otherwise provided with a coating 20 which matches the finish 21 on the fender 8 of the vehicle. Thereby a separate matching ornamental member to be applied to the fender shield in the area 23 is eliminated or avoided. This affords substantial economy as well as being of less weight, and not being subject to dislodgment of a separate attached ornamental panel member.

In addition, the fender shield 5 is provided along its lower margin with an outwardly projecting longitudinal rib or blister 25 that extends substantially beyond the normal plane of the fender shield panel and affords a protective and reinforcing rib. The blister rib 25 serves as a buffer against objects that may otherwise rub against and mar the finish 20 applied to the fender shield panel. Further, the rib 25 serves as a guard against gravel or other objects that may be thrown up by the vehicle wheel and that might mar the finish 20. Such blister rib also prevents splash of road dirt up against the fender shield. To this end the lower side of the blister rib 25 provides an oblique downwardly and inwardly sloping buffer panel or wall 27 of substantial width that joins the inwardly directed lower marginal flange 17 with which the rib 25 cooperates through the wall panel 27 thereof in structural reinforcing relation.

It will be appreciated that because it serves as a buffer, the lower, generally downwardly facing wall 27 of the lower marginal blister 25 will be subjected to substantial impingement thereagainst of stones or gravel or other objects thrown up by the wheels of the vehicle and more particularly the tires in running. Therefore, any paint that might be applied to the outer side of the blister panel 27 would be chipped off and thus become unsightly. In fact, where a rustable material is used in the fender shield chipping off of the finish exposes the raw surface to rusting. However, in the present instance, by leaving the outer surface of the lower panel 27 unfinished or raw and simply polished not only is a highly ornamental effect produced as contrast to the finish 20 on the upper portion of the fender shield panel 5 and on the upper side of the ridge 25, but there is no paint to chip off. In fact the exposed surface of the rib 25 preferably includes the ridge extremity thereof so that if such ridge extremity is brushed or abraded by objects in or along the roadway over which the vehicle is driven there will be no chipping or abrading of the finish 20 which stops short of the ridge on the upper side thereof as best seen in Fig. 3.

As will be appreciated, the contrasting ornamental effect of the unpainted bare surface afforded on the panel 27 along the lower margin of the fender shield panel blends harmoniously into the bare polished area 23 at the forward end of the fender shield panel and the gravel guard 22. Moreover, this is effected in a most economical and efficient manner since no additional part or parts are required and no assembly problem is encountered.

In making the fender shield 5 it is fabricated to form from a panel of the sheet material such as stainless steel sheet by any suitable process, such as die stamping which is a well known process for forming sheet metal. This forming includes, of course, the lower marginal rib or blister 25. Then, the lower face 27 and preferably also the ridge of the rib 25 are masked and possibly also the area 23 or a similar area where desired is masked, and the remainder of the outer surface of the fender shield panel is covered with the paint layer 20 so as to leave the masked area or areas bare. Before or after application of the paint layer 20, the bare area or areas may be polished and burnished or even flash chrome plated if desired.

It will be understood that modifications and variations may be effected without departing from the scope of the novel concepts of the present invention.

I claim as my invention:

1. In a fender and fender shield assembly including a fender having a wheel access opening therein, a fender shield for substantially closing said opening, said fender shield comprising a body of sheet material having longitudinally along the lower margin thereof a generally outwardly projecting but longitudinally elongated blister rib provided with a defined longitudinal crown ridge and generally downwardly and outwardly facing side below said ridge exposed at the outer side of the panel, and a coating of covering material on the fender shield panel to match the coating on the fender, with said lower side wall of said blister rib being bare and therefore adapted to serve as a buffer for stones or gravel thrown up by the wheel of a vehicle with which the fender and fender shield are associated without danger of chipping or otherwise mutilating of said coating and leaving said lower surface substantially unaffected visibly by reason of its bare condition, said coating stopping short of the upper side of ridge of said blister rib so as also to leave the ridge bare.

2. In a fender shield for disposition in substantially closing relation to a wheel access opening in a vehicle fender that has a decorative coating thereon, the fender shield comprising a panel of sheet material provided at the back thereof with means for attachment to a vehicle fender, the lower margin of the panel being provided with a downwardly opening recess extending at opposite ends short of the end extremity portions of the panel, the recess being defined by a longitudinally extending and outwardly projecting rib structure having a lower outwardly facing generally inwardly sloping face to serve as a dirt or gravel buffer and said rib running out at the bottom of the panel in said end extremity portions of the panel spaced from the respective opposite ends of the panel, and a coating on the fender shield panel above said rib to match the fender decorative coating, said lower surface of the rib being bare of said coating so as to be capable of impingement thereagainst of stones and gravel substantially without visibly affecting the surface finish appearance, while said surface serves as a deflecting buffer to prevent the stones or gravel from impinging upon said coating.

3. In a fender shield for disposition in substantial closing relation to a wheel access opening in a vehicle fender, a stainless steel sheet panel having a longitudinally elongated outwardly projecting lower marginal blister rib thereon provided with a generally downwardly facing and substantially obliquely inwardly sloping buffer panel flange side portion of substantial width, said buffer flange portion being polished, and a coating of solidified paint material on the outer face of the panel above said blister rib, said buffer flange being bare of said coating and serving as a protective buffer to prevent impingement upon said coating of gravel or stones or the like thrown up by a vehicle wheel toward the lower margin of the fender shield.

References Cited in the file of this patent
UNITED STATES PATENTS

| | | |
|---|---|---|
| 2,202,903 | Fergueson | June 4, 1940 |
| 2,217,838 | Fergueson | Oct. 15, 1940 |
| 2,525,595 | Fergueson | Oct. 10, 1950 |